(12) United States Patent
Matsuoka et al.

(10) Patent No.: US 6,233,930 B1
(45) Date of Patent: May 22, 2001

(54) POWER STEERING DEVICE

(75) Inventors: Hirofumi Matsuoka, Kyoto; Yoshihiro Goto, Kashiwara; Yoshiaki Hamasaki, Kashiba, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/462,056

(22) PCT Filed: Jun. 20, 1999

(86) PCT No.: PCT/JP99/02685

§ 371 Date: Dec. 28, 1999

§ 102(e) Date: Dec. 28, 1999

(87) PCT Pub. No.: WO99/59859

PCT Pub. Date: Nov. 25, 1999

(30) Foreign Application Priority Data

May 21, 1998 (JP) .................................................. 10-140270

(51) Int. Cl.$^7$ ........................................................ B62D 5/07
(52) U.S. Cl. ............................................. 60/456; 417/366
(58) Field of Search .................................... 417/352, 366, 417/367, 368, 372; 60/456, 911

(56) References Cited

U.S. PATENT DOCUMENTS

| 4,304,296 | * | 12/1981 | Shaffer | 417/366 X |
| 4,428,719 | * | 1/1984 | Hayashibara et al. | 417/354 |
| 4,566,864 | * | 1/1986 | Yamamoto et al. | 417/353 |
| 5,360,322 | | 11/1994 | Henein et al. | |
| 5,593,287 | * | 1/1997 | Sadakata et al. | 417/366 |
| 5,924,841 | * | 7/1999 | Okamura et al. | 417/423.4 X |
| 6,034,465 | * | 3/2000 | McKee et al. | 417/352 X |
| 6,132,184 | * | 10/2000 | robertson et al. | 417/366 X |

FOREIGN PATENT DOCUMENTS

| 1-66486 | 4/1989 | (JP) . |
| 4-138174 | 12/1992 | (JP) . |

* cited by examiner

*Primary Examiner*—John E. Ryznic
(74) *Attorney, Agent, or Firm*—Darby & Darby

(57) ABSTRACT

A power steering apparatus integrally comprises an electric motor, a hydraulic pump driven by the electric motor, and a controlling device which is disposed between the electric motor and hydraulic pump and which controls the electric motor, in which steering is assisted by oil pressure generated by the hydraulic pump, wherein a radiating body for radiating a heat generated by the controlling device is disposed between the controlling device and hydraulic pump, so that the heat generated by the controlling device is radiated to the hydraulic pump. With this configuration, it is possible to efficiently radiate a heat generated inside the controlling device, the heat radiation can be designed without being influenced by ambient condition, and it is possible to be replaced by, member having a low heat-resistance.

6 Claims, 10 Drawing Sheets

POWER STEERING DEVICE

TECHNICAL FIELD

The present invention relates to an improvement of a power steering apparatus integrally having an electric motor, a hydraulic pump being driven by the electric motor, and a controlling device for controlling the electric motor, in which steering is assisted by oil pressure generated by the hydraulic pump.

BACKGROUND ART

A hydraulic pump for feeding an operating fluid to a hydraulically operating equipment such as a hydraulic actuator (control valve) or the like provided in a power steering apparatus of automobile, and an electric motor for driving the hydraulic pump are constructed as shown in FIG.1, for example. The hydraulic pump 1 of this power steering apparatus comprises a pump housing 12 and covering body 16 for covering a portion of the pump housing 12. A controlling device housing 6 in which a controlling device for controlling the electric motor 4 is contained is disposed between the pump housing 12 and electric motor 4.

A portion 60 which produces heat by a large current inside the controlling device housing 6 is provided on the electric motor 4 side of the controlling device housing 6 and radiates heat to ambient by heat radiation structure such as a fin or the like provided on a surface of the controlling device housing 6.

Here, when a structure for transmitting heat from a heat-producing member to another member for radiating heat is employed, in order to enhance the thermal conductivity, the following methods are conceivable: increasing a clamping torque of bolts for attaching and clamping the heat-producing member and other member; enhancing a degree of intimate contact between the heat-producing member and other member by enhancing surface quality of adhered surfaces therebetween; applying a material having a high thermal conductivity such as a silicon grease or the like onto the adhered surfaces of the heat-producing member and other member; and sandwiching a sheet having a high thermal conductivity between the heat-producing member and other member.

On the other hand, in order to secure a water-resistance for preventing water from being impregnated between the heat-producing member and other member, there are the following methods: sandwiching a rubber packing between the heat-producing member and other member; applying a liquid packing between the heat-producing member and other member; and applying an O-ring for sealing between the heat-producing member and other member.

However, temperature of an engine room in which the hydraulic pump 1, electric motor 4, and controlling device housing 6 containing the controlling device of the power steering apparatus are provided is increased by heat generated by the engine. Therefore, the heat radiation method to ambient by the heat radiation structure such as the fin or the like is employed, the heat radiation efficiency is lowered, and there is an adverse possibility that temperature of the heat-producing portion 60 inside the controlling device housing 6 exceeds acceptable temperature.

In the case of the method for enhancing thermal conductivity, it is difficult to control dimensions of the connected portions of the heat-producing member and other member, and there is a problem that the method for enhancing thermal conductivity is not compatible with the method for securing water-resistance.

It is an object of the present invention to provide a power steering apparatus capable of efficiently radiating heat generated inside the controlling device, capable of allowing heat-radiation design without being influenced by ambient condition, and capable of allowing replacement to members having low heat-resistance.

It is another object of the invention to provide a power steering apparatus capable of stably radiating heat generated inside a controlling device, having an excellent water-resistance against outside, in which the dimensions for fitting is easily controlled.

DISCLOSURE OF THE INVENTION

A power steering apparatus according to the present invention integrally comprising an electric motor, a hydraulic pump driven by the electric motor, and a controlling device which is disposed between the electric motor and hydraulic pump and which controls the electric motor, in which steering is assisted by oil pressure generated by the hydraulic pump, is characterized in that a radiating body for radiating a heat generated by the controlling device is disposed between the controlling device and hydraulic pump, so that the heat generated by the controlling device is radiated to the hydraulic pump.

In the power steering apparatus of the present invention, it integrally comprises the electric motor, the hydraulic pump driven by the electric motor, and the controlling device which is disposed between the electric motor and hydraulic pump which controls the electric motor, and steering is assisted by oil pressure generated by the hydraulic pump. The radiating body disposed between the controlling device and hydraulic pump radiates the heat generated by the controlling device to the hydraulic pump. Therefore, it is possible to efficiently radiate a heat generated inside the controlling device, the heat radiation can be designed without being influenced by ambient condition, and it is possible to be replaced by members having low heat-resistance.

An another power steering apparatus according to the present invention is characterized in that the radiating body is a sheet for transmitting the heat, held between the controlling device and hydraulic pump.

In the power steering apparatus of the present invention, the radiating body is a sheet which is held between the controlling device and hydraulic pump and which transmits the heat. Therefore, it is possible to efficiently radiate a heat generated inside the controlling device, the heat radiation can be designed without being influenced by ambient condition, and it is possible to be replaced by members having low heat-resistance.

An another power steering apparatus according to the present invention is characterized in that the controlling device and hydraulic pump have fitting configurations, a cross section of the fitting configurations is approximately circular in shape, and a convex portion and concave portion of the fitting configurations provide a space for clamping an O-ring therebetween.

In the power steering apparatus of the present invention, it integrally comprises the electric motor, the hydraulic pump driven by the electric motor, and the controlling device which is disposed between the electric motor and hydraulic pump and which controls the electric motor, and steering is assisted by oil pressure generated by the hydraulic pump. The radiating body disposed between the controlling device and hydraulic pump radiates the heat generated by the controlling device to the hydraulic pump. Further, the controlling device and hydraulic pump have fitting configurations, a cross section of the fitting configurations is approximately circular in shape, and a convex portion and concave portion of the fitting configurations provide a space for clamping the O-ring therebetween. Therefore, it is possible to stably radiate a heat generated inside the controlling device, and since the O-ring is clamped between the convex portion and concave portion of the fitting configurations, water-resistance against outside is excellent, and it is easy to control the dimensions for fitting.

An another power steering apparatus according to the present invention is characterized in that the controlling device is contained inside a housing connected to the hydraulic pump, the housing and hydraulic pump have fitting configurations, a cross section of the fitting configurations is approximately circular in shape, and a convex portion and concave portion of the fitting configurations provide a space for clamping an O-ring therebetween.

In the power steering apparatus of the present invention, it integrally comprises the electric motor, the hydraulic pump driven by the electric motor, and the controlling device which is disposed between the electric motor and hydraulic pump and which controls the electric motor, and steering is assisted by oil pressure generated by the hydraulic pump. The controlling device is contained inside a housing connected to the hydraulic pump, the radiating body disposed between the housing and hydraulic pump radiates the heat generated by the controlling device to the hydraulic pump through at least the housing. Further, the housing and hydraulic pump have fitting configurations, a cross section of the fitting configurations is approximately circular in shape, and a convex portion and concave portion of the fitting configurations provide a space for clamping the O-ring therebetween. Therefore, it is possible to stably radiate a heat generated inside the controlling device, and since the O-ring is clamped between the convex portion and concave portion of the fitting configurations, water-resistance against outside is excellent, and it is easy to control the dimensions for fitting.

BEST MODE FOR CARRYING OUT THE INVENTION

Embodiments of the present invention will be explained below based on the drawings respectively showing the embodiments.

Figure 1:
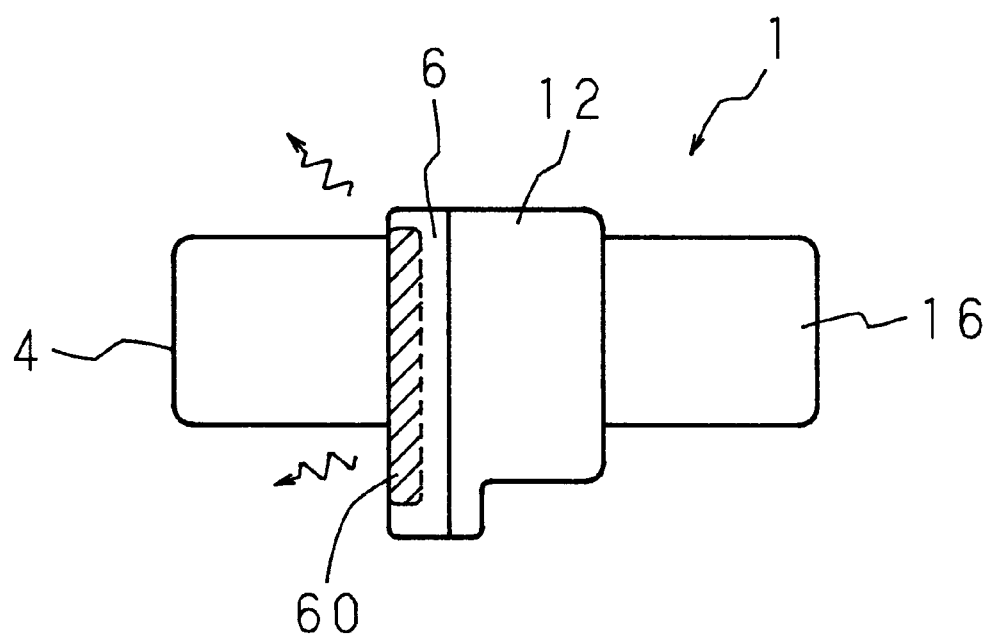
FIG. 1 is an explanatory drawing for explaining a configuration of a conventional power steering apparatus integrally having a controlling device, electric motor, and hydraulic pump.
Figure 2:
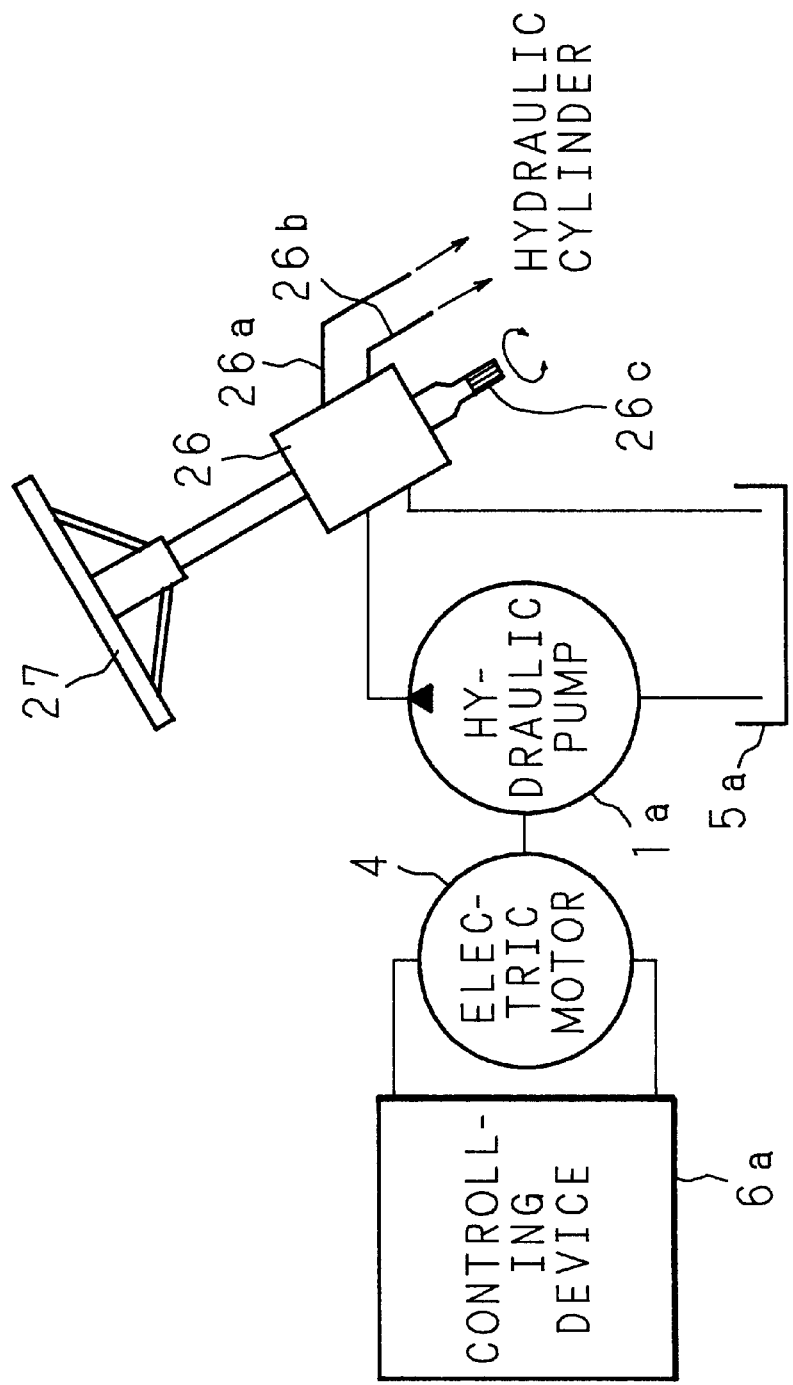
FIG. 2 is a block diagram showing a configuration of an embodiment of a power steering apparatus according to the present invention.

FIG. 2 is a block diagram showing a configuration of an embodiment of a power steering apparatus according to the present invention. In this power steering apparatus, a controlling device contained in a controlling device housing 6a applies a voltage to an electric motor 4 to drive the same, and the electric motor 4 drives a hydraulic pump 1a to generate an operating fluid pressure. A control valve 26 controls the pressure of operating fluid to be fed to pipelines 26a and 26b leading to a hydraulic cylinder (not shown).

Operation of a steering wheel 27 actuates a gear apparatus (not shown) including a pinion gear 26c provided at a lower end of the steering wheel, thereby, the control valve 26 controls the pressure of operating fluid to be fed to the pipelines 26a and 26b leading to the hydraulic cylinder. Therefore, the hydraulic cylinder is actuated to generate a steering assisting force in accordance with an operation amount of the steering wheel 27 including the operating direction.

The operating fluid circulates in a hydraulic circuit comprising the hydraulic pump 1a, control valve 26, hydraulic cylinder, as well as an oil feeding tank 5a and the like.

The controlling device 6a detects a current flowing through the electric motor 4, and controls the voltage to be applied to the electric motor 4 by switching it between high and low based on a variation amount of motor current.

Figure 3:
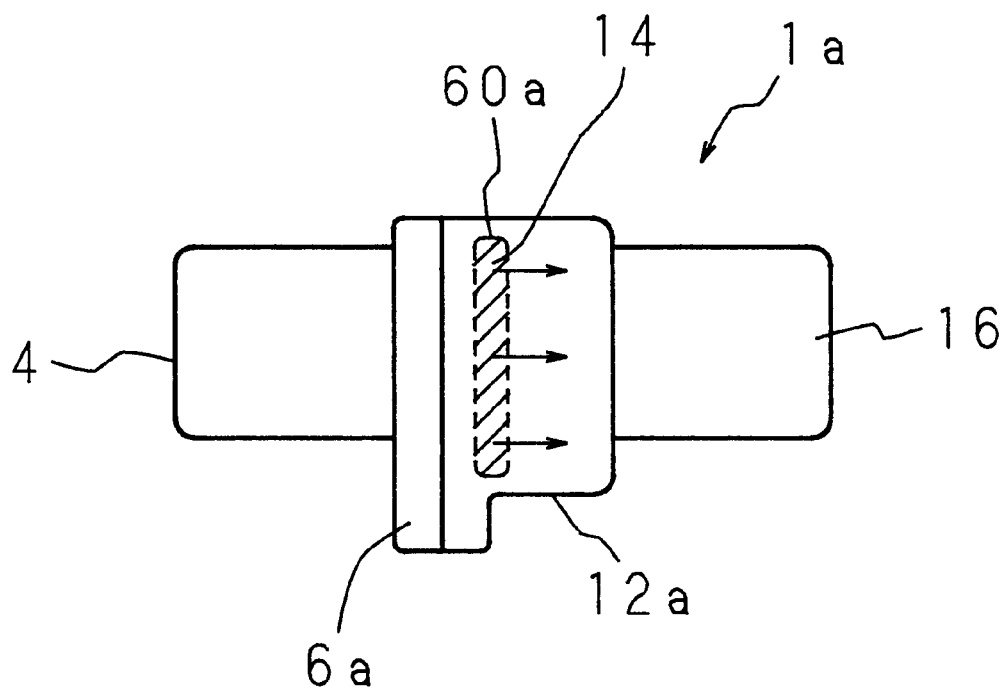
FIG. 3 is an explanatory drawing for explaining a configuration of a power steering apparatus according to the present invention integrally having a controlling device, electric motor, and hydraulic pump.

FIG. 3 is an explanatory drawing for explaining a configuration of the power steering apparatus according to the present invention integrally having the controlling device housing 6a, electric motor 4, and hydraulic pump 1a. The hydraulic pump 1a of this power steering apparatus comprises a pump housing 12a, and a covering body 16 for covering a portion of the pump housing 12a. The controlling device housing 6a in which the controlling device for controlling the electric motor 4 is contained is disposed between the pump housing 12a and electric motor 4.

The controlling device housing 6a and pump housing 12a are connected together with fitting configurations in which a portion of the controlling device housing 6a is fitted in the pump housing 12a. A portion 60a which produces heat by a large current inside the controlling device housing 6a is provided to the pump housing 12a side, and it sandwiches a sheet 14 having high thermal conductivity which is a heat radiating body for transmitting and radiating the heat generated by the controlling device to the pump housing 12a, with the pump housing 12a.

With these configurations, since the heat generated by the controlling device contained inside the controlling device housing 6a is transmitted and radiated to a metal body having a large thermal capacity rather than air having a small thermal capacity, it is possible to efficiently radiate the heat.

Figure 4:
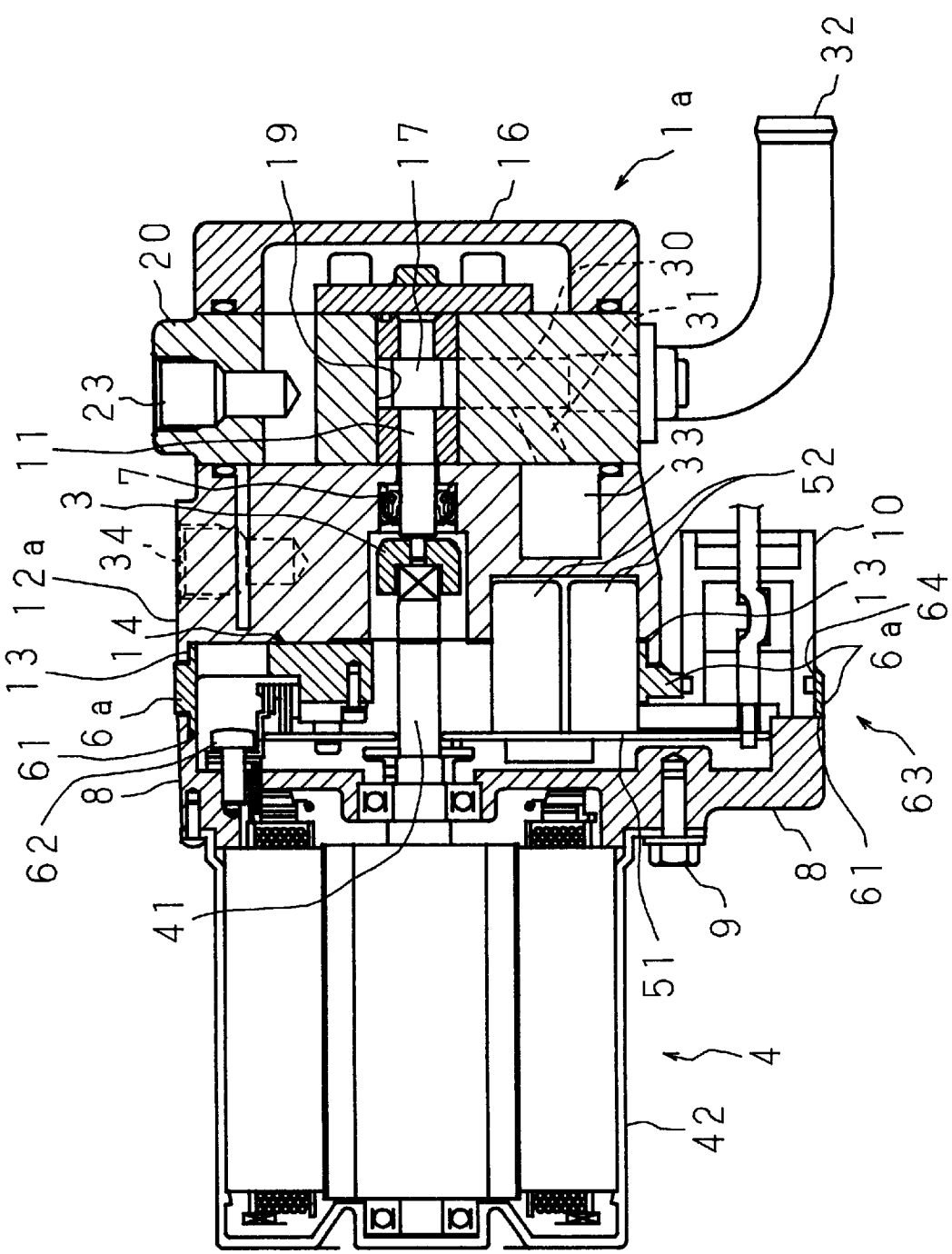
FIG. 4 is a vertical sectional front view showing a configuration of the power steering apparatus according to the present invention integrally having the controlling device, electric motor, and hydraulic pump.

FIG. 4 is a vertical sectional front view showing a configuration of the power steering apparatus according to the present invention integrally having the controlling device housing 6a, electric motor 4, and hydraulic pump 1a. This power steering apparatus comprises the hydraulic pump 1a having a drive shaft 11 which is rotatably supported by the pump housing 12a, the electric motor 4 having a motor shaft 41 interlocked to the drive shaft 11 through a shaft coupling 3, the controlling device housing 6a disposed between the electric motor 4 and pump housing 12a and provided therein with the controlling device for controlling the electric motor 4, and a sealing member 7 for sealing around the drive shaft 11 to prevent oil leaks from the hydraulic pump 1a into the controlling device housing 6a.

A gear housing 20 having a drive gear 17 provided to the drive shaft 11, a driven gear (not shown) meshed with the drive gear 17, and a gear chamber 19 containing the drive gear 17 and driven gear is connected to the pump housing 12a.

A bottomed cylindrical covering body 16 which is detachably connected by a plurality of clamp screws is mounted to the gear housing 20.

A suction opening 32 which is communicating with the gear chamber 19 and covering body 16, and a discharge opening 23 which is communicating with the gear chamber 19 are provided to the gear housing 20. Provided at the gear housing 20 side within the pump housing 12a are an operating fluid circulating route 33 which is communicating with the gear chamber 19 in the gear housing 20 and covering body 16 and which circulates an operating fluid to cool the heat generated by the controlling device in the controlling device housing 6a. A thickness between the operating oil circulating route 33 of the pump housing 12a and the controlling device housing 6a is made thin for enhancing thermal conductivity.

The controlling device housing 6a and pump housing 12a have fitting configurations of a fitting portion 13 (a space for clamping an O-ring). The sheet 14 having high thermal conductivity which is a heat radiating body is sandwiched between the controlling device housing 6a and pump housing 12a.

An electric motor 4 side end portion of the controlling device housing 6a is detachably mounted to a disk-like covering body 8 through an annular sealing plate 61 by a plurality of clamp screws 62. One side of the controlling device housing 6a is outwardly protruded, and a perforation 64 for mounting a connector is formed in the protruding portion 63, the connector 10 is fitted through the perforation 64, and a sealing member is provided between an outer peripheral of the connector 10 and the perforation 64 to seal therebetween.

The controlling device contained inside the controlling device housing 6a comprises a circuit substrate 51 placed so as to surround the motor shaft 41, and a plurality of capacitors 52 to be mounted on the circuit substrate 51 exposed.

As shown in FIG. 4, the electric motor 4 is contained inside a motor housing 42, and the motor housing 42 is detachably mounted to the covering body 8 by a plurality of clamp screws 9.

Figure 5:
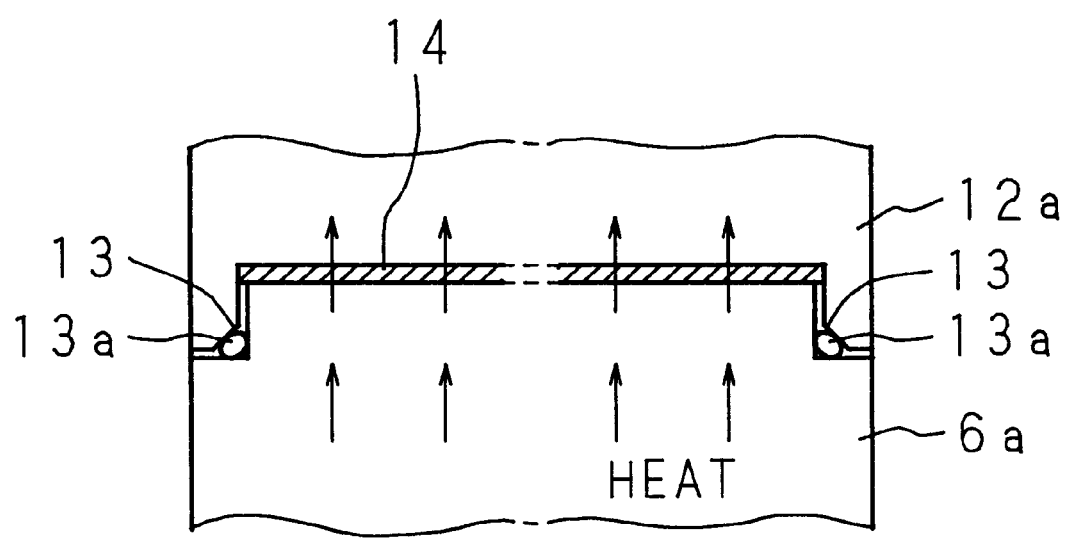
FIG. 5 is an enlarged explanatory view for explaining a joint portion of a controlling device housing and pump housing.

FIG. 5 is an enlarged explanatory view for explaining a joint portion of the controlling device housing 6a and pump housing 12a. The sheet 14 having high thermal conductivity for transmitting and radiating a heat generated by the controlling device contained inside the controlling device housing 6a is sandwiched in the joint portion, so that the heat generated by the controlling device is radiated to the pump housing 12a of the hydraulic pump 1a.

The controlling device housing 6a and pump housing 12a have fitting configurations with approximately circular fitting sectional shape. A fitting portion 13 at which a convex portion (the controlling device housing 6a side) and concave portion (the pump housing 12a side) of the fitting configurations is opposed forms a groove hole having approximately triangular sectional shape for clamping an O-ring 13a by the convex portion and concave portion. The O-ring 13 fitted along the fitting portion 13 at the controlling device housing 6a side is clamped by the fitting portion 13 at the pump housing 12a side whose corner is rounded into approximately triangle shape.

In the controlling device, electric motor 4, and hydraulic pump 1a of the power steering configured as above, by driving the electric motor 4, the drive gear 17 and driven gear meshed with the drive gear 17 are rotated through the motor shaft 41, shaft coupling 3, and drive shaft 11. The operating fluid is fed to the discharge opening 23 from the gear chamber 19 through the suction opening 32 from the oil feeding tank 5a, and fed to one side of the operating chamber of the hydraulic cylinder from the discharge opening 23 through the control valve 26, and is returned to the oil feeding tank 5a from the other side of the operating chamber of the hydraulic cylinder.

On the other hand, a portion of the operating fluid is fed to the gear chamber 19 from the oil feeding tank 5a through another suction opening 34 and the operating fluid circulating route 33.

A heat generated by the controlling device inside the controlling device housing 6a is transmitted to the sheet 14 and radiated to the pump housing 12a of the hydraulic pump 1a. The radiated heat is cooled by the operating fluid flowing through the operating fluid circulating route 33 and the like, and the heat generated inside the controlling device is stably radiated. The maximum temperature of the operating fluid is up to 120° C., and the limit temperature of the controlling device is 150° C. (temperature for continuous operation is 80° C.). Therefore, even if the maximum current of the controlling device is increased and thus the heat amount is increased, the controlling device can sufficiently be cooled. Further, since expensive high temperature resistant parts need not be used for the controlling device, it is possible to reduce the part costs.

The O-ring 13a applied to the fitting configurations of the controlling device housing 6a and pump housing 12a prevents water from being impregnated from outside. Further, since the controlling device housing 6a and pump housing 12a are jointed together by the fitting configurations, it is easy to control the dimensions for the joint.

Figure 6:
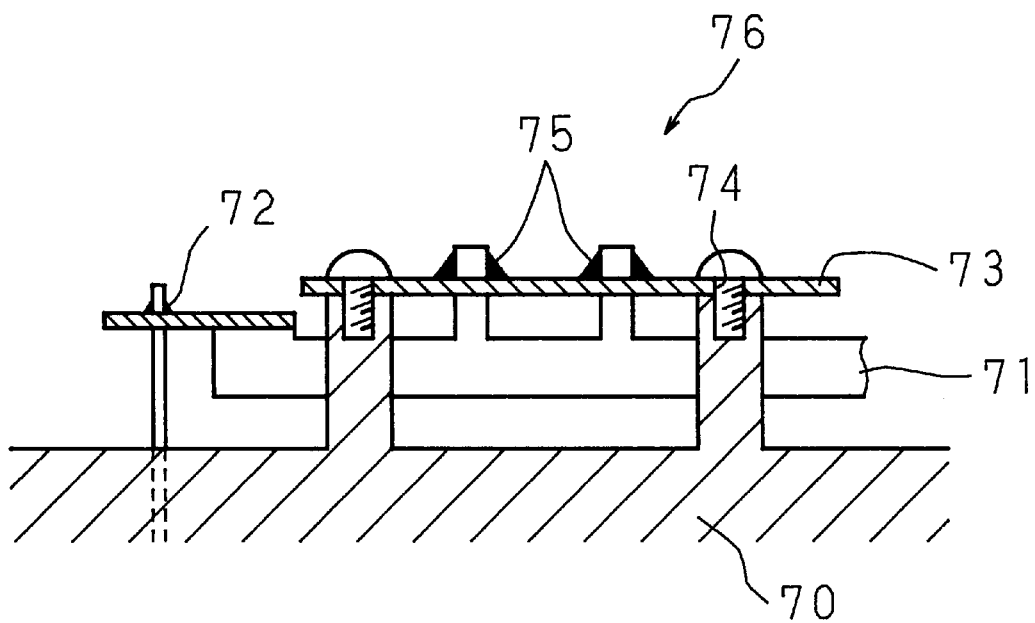
FIG. 6 is a vertical sectional view showing an example of a conventional configuration of the controlling device of the power steering apparatus.

FIG. 6 is a vertical sectional view showing an example of a conventional configuration of the controlling device of the power steering apparatus. In this controlling device 76, a circuit substrate 73 is fixed to protruding portions by screws 74. A bus bar 71 such as a power wire of the electric motor 70 through which a large current flows is connected to a circuit on the circuit substrate 73 by soldering a portion 75 of a branch-like protrusion of the bus bar 71 penetrating through the circuit substrate 73 from below, and the bus bar 71 is held between the circuit substrate 73 and electric motor 70. The bus bar 71 and electric motor 70 are connected by a fixing portion 72 comprising the bus bar 71 and a conductor bar protruding from the electric motor 70 which are soldered together.

However, since a large current of 70A to 80A flows through the bus bar 71 and the temperature rises and drops repeatedly, the bus bar 71 expands and contracts repeatedly. Therefore, if the connected portions of the circuit substrate 73 and electric motor 70 are stationary, a stress is generated in the connected portions, and there is a problem that a reliability of the circuit substrate 73 and soldered portions is lowered.

Figure 7:
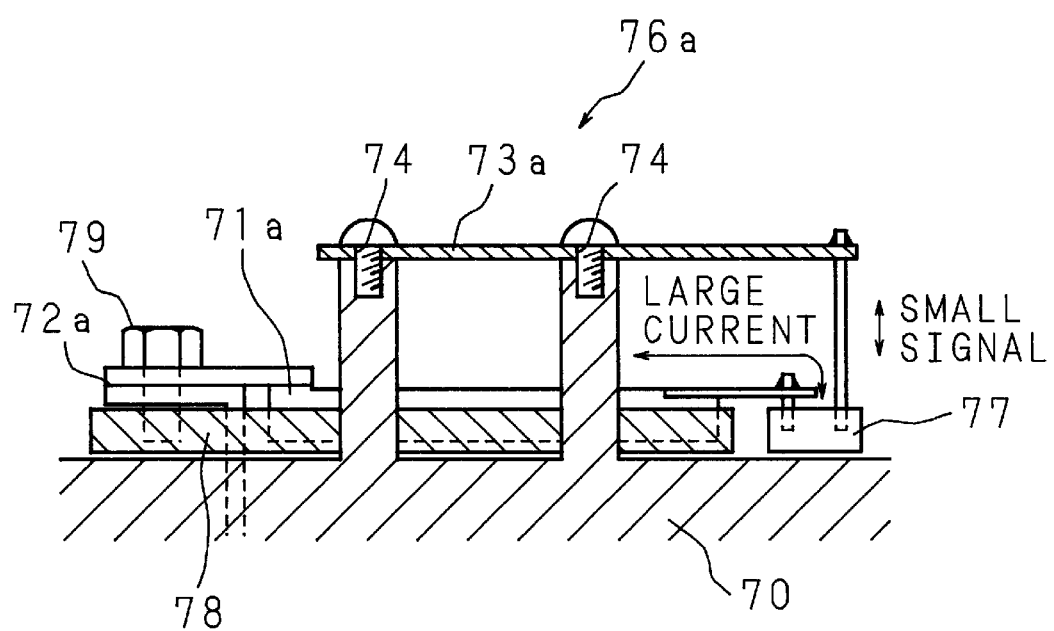
FIG. 7 is a vertical sectional view showing an example of a configuration of the controlling device of the power steering apparatus.

FIG. 7 is a vertical sectional view showing an example of a configuration of the controlling device which solved the above problem. In this controlling device 76, a circuit substrate 73a is fixed to protruding portions of an electric motor 70 by screws 74. A bus bar 71a of the electric motor 70 through which a large current flows is not directly connected to a circuit on the circuit substrate 73a, and is directly connected to an FET (field-effect transistor) 77 controlled by a small signal from the circuit on the circuit substrate 73a by soldering, thereby feeding the large current. The circuit substrate 73a and FET 77 are connected to each other by small signal line of the FET 77 soldered to the circuit substrate 73a.

The bus bar 71 and electric motor 70 are isolated from each other by an insulating member 78, and connected together by clamping a flattened portion 72a having a bolt hole for the bus bar 71a and a flattened portion having a bolt hole protruding from the electric motor 70 by a bolt 79.

In this controlling device 76a, as described above, a member through which a large current flows and which expands and contracts repeatedly is not completely fixed, and the connected portions through which the large current flows are fastened by bolts individually, so that the portion whose temperature rises and drops repeatedly by the large current and which expands and contracts repeatedly does not directly apply the stress to the soldered portions such as of the circuit substrate 73a. Therefore, it is possible to enhance the reliability of the circuit substrate 73a and soldered portions.

Figure 8:
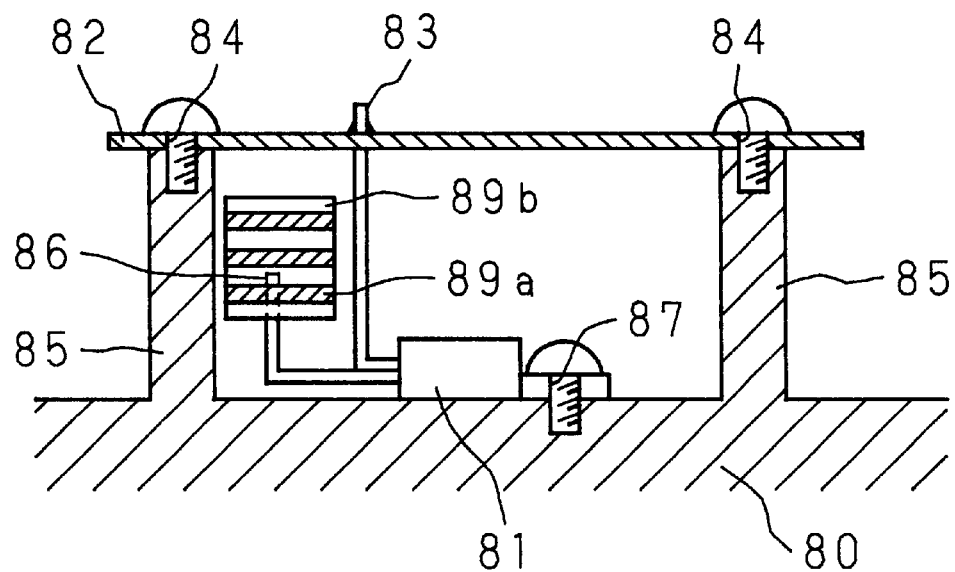
FIG. 8 is a vertical sectional view showing an example of a conventional configuration of the controlling device of the power steering apparatus.

FIG. 8 is a vertical sectional view showing an example of a conventional configuration of the controlling device of the power steering apparatus. In this controlling device, a circuit substrate 82 is fixed to protruding portions 85 of an electric motor 80 by screws 84. An FET 81 which is a drive element of the electric motor 80 is fixed to the electric motor 80 by a screw 87, and is connected to the circuit substrate 82 by a small signal line 83 of the FET 81 soldered onto the circuit substrate 82. A large signal line 86 (large current wire) of the FET 81 passes through the bus bars 89a from below and connected to the bus bars 89a such as a power wire or the like of the electric motor 80 through which the large current flows. The bus bars 89a together with insulating members 89b form a plurality of layers, and are placed along the depth direction of the drawing, in a space between the electric motor 80 and circuit substrate 82 such that the bus bars 89a do not come into contact with the electric motor 80 and circuit substrate 82.

According to the conventional controlling device, fixing of the circuit substrate 82, expansion and contraction of members (the bus bar 89a and the large signal line 86 of the FET 81), and heat radiation of the FET 81 has been taken into consideration, a large space was provided between the electric motor 80 and circuit substrate 82 as shown in FIG. 8, and the electric motor 80, FET 81, bus bar 89a, and circuit substrate 82 were formed into a sandwich structure. However, the space density was low, and there was still a room for reducing in size.

Figure 9:
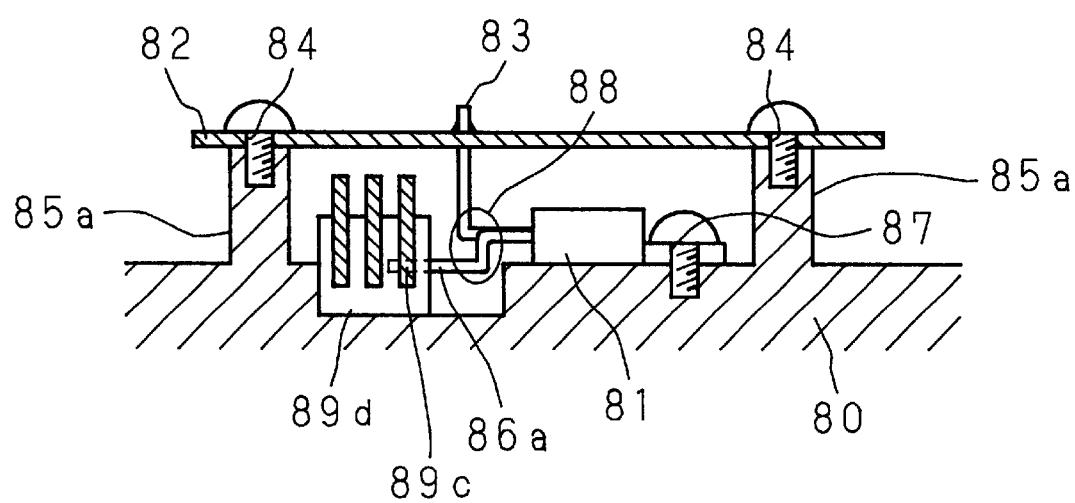
FIG. 9 is a vertical sectional view showing an example of a configuration of the controlling device of the power steering apparatus.

FIG. 9 is a vertical sectional view showing an example of a configuration of the controlling device which solved the above problem. In this controlling device, the circuit substrate 82 is fixed to protruding portions 85a of the electric motor 80 by screws 84. The protruding portions 85a are made shorter than the conventional protruding portions 85. The FET 81 which is a drive element of the electric motor 80 is fixed to the electric motor 80 by a screw 87, and is connected to the circuit substrate 82 by a small signal line 83 of the FET 81 soldered onto the circuit substrate 82.

The electric motor 80 is provided with a recess portion which is long along the depth direction of the drawing in the vicinity of the FET 81 of the housing thereof. A large signal line 86a of the FET 81 includes a portion 88 which is bent into a crank shape along a wall of the recess portion. The tip of portion 88 which is bent into the crank shape of the large signal line 86a of the FET 81 is connected to bus bars 89c such as power wires or the like of the electric motor 80 through which a large current flows. The bus bars 89c comprise a plurality of layers in the insulating member 89d, and each of the layers is half exposed from the insulating member 89d for heat radiation.

The bus bars 89c and insulating member 89d are placed along the depth direction of the drawing, with the insulating member 89d is half buried in the recess portion of the housing of the electric motor 80.

In this controlling device, as described above, the housing of the electric motor 80 is provided with the recess portion for placing the bus bars 89c, and the large signal line 86a is provided with the portion 88 which is bent into the crank-shape along the wall of the recess portion so that the stress caused by expansion and contraction of the large signal line 86a of the FET 81. Therefore, the space between the electric motor 80 and circuit substrate 82 can be reduced in size, the space density can be increased, and the reliability of the joint portion between the members can be enhanced.

Meanwhile, connectors suitable for the vehicle side harnesses are necessary for connecting the electric motor and power-source/signal line of the controlling device. Further, in order to obtain the water-resistance of the joint portion of the connectors and controlling device, it is necessary to seal. Conventionally, O-rings were applied to the connectors to obtain the water-resistance.

However, each of the connectors has different shape, and it is necessary to obtain the water-resistance according to each of the connectors, and the main-body case side (housing side of the controlling device) corresponding to each of the connectors must be machined into a shape suitable for the O-ring, and surface-finished suitable for the O-ring. Therefore, the number of steps is increased, and the manufacturing cost is increased.

Figure 10A:
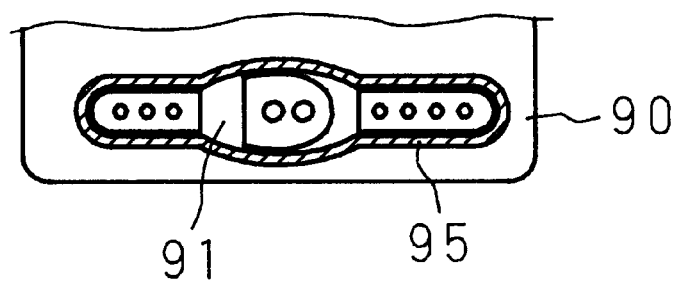
FIG. 10A is a transversal sectional view showing an example of a configuration of a connector of the controlling device of the power steering apparatus.
Figure 10B:
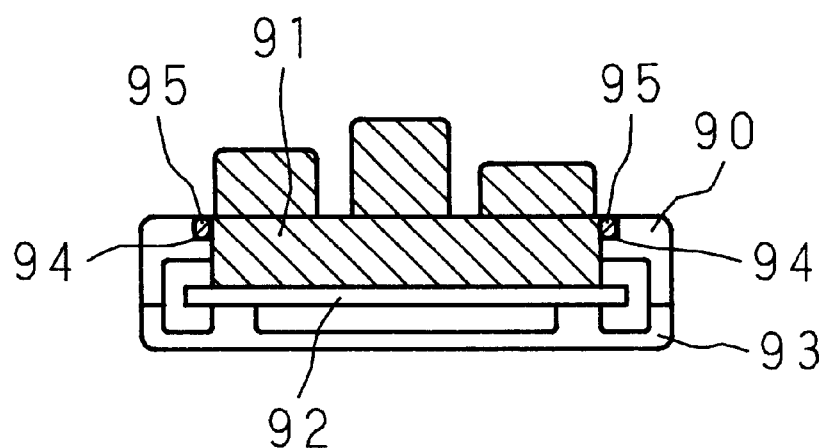
FIG. 10B is a longitudinal sectional view showing the example of the configuration of the connector of the controlling device of the power steering apparatus.

FIG. 10A is a transversal sectional view showing an example of a configuration of a connector of the controlling device which solves the above problem, and FIG. 10B is a longitudinal sectional view thereof. This connector 91 integrally comprises a plurality of different connectors, and casting surface of the main-body case 90 side is not subjected to machining or surface-finishing.

A substrate 92 of the connector 91 together with a cover 93 thereof are fixed to the main-body case 90. The connector 91 is connected to the substrate 92 of the main-body case 90, and a groove 94 for charging a liquid packing 95 which is a sealing member is formed in the fitting portion between the main-body case 90 and connector 91, in a state where the connector 91 is fitted to the main-body case 90.

As described above, the connector of this controlling device integrally comprises the plurality of different connectors, and the casting surface of the main-body case 90 side is not subjected to machining or surface-finishing. The connector 91 is connected to the main-body case 90, and the groove 94 for charging the liquid packing 95 which is a sealing member is formed in the fitting portion between the main-body case 90 and connector 91, in a state where the connector 91 is fitted to the main-body case 90. Therefore, it is possible to obtain the water-resistance in the joint portion between the main-body case 90 and connector 91 by charging the liquid packing 95 into the groove 94. Further, since the casting surface need not be subjected to machining or surface-finishing, the manufacturing cost can be reduced.

Industrial Applicability

As described above, in the power steering apparatus according to the present invention, it is possible to efficiently radiate a heat generated inside the controlling device, the heat radiation can be designed without being influenced by ambient condition, and it is possible to be replaced by a member having a low heat-resistance.

Further, it is possible to efficiently radiate a heat generated inside the controlling device, the heat radiation can be designed without being influenced by ambient condition, and it is possible to be replaced by a member having a low heat-resistance.

Furthermore, it is possible to stably radiate a heat generated inside the controlling device, and since the O-ring is clamped between the convex portion and concave portion of the fitting configurations, water-resistance against outside is excellent, and it is easy to control the dimensions for fitting.

What is claimed is:

1. A power steering apparatus integrally comprising an electric motor, a hydraulic pump driven by said electric motor, and a controlling device which is disposed between said electric motor and hydraulic pump and which controls said electric motor, in which steering is assisted by oil pressure generated by said hydraulic pump, wherein a radiating body for radiating a heat generated by said controlling device is disposed between said controlling device and hydraulic pump, so that the heat generated by said controlling device is radiated to said hydraulic pump.

2. The power steering apparatus according to claim 1, wherein said radiating body is a sheet for transmitting the heat, held between said controlling device and hydraulic pump.

3. The power steering apparatus according to claim 1, wherein said controlling device and hydraulic pump have fitting configurations, a cross section of said fitting configurations is approximately circular in shape, and a convex portion and concave portion of said fitting configurations provide a space for clamping an O-ring therebetween.

4. The power steering apparatus according to claim 1, wherein said controlling device is contained inside a housing connected to said hydraulic pump, said housing and hydraulic pump have fitting configurations, a cross section of said fitting configurations is approximately circular in shape, and a convex portion and a concave portion of said fitting configurations provide a space for clamping an O-ring therebetween.

5. The power steering apparatus according to claim 2, wherein said controlling device and hydraulic pump have fitting configurations, a cross section of said fitting configurations is approximately circular in shape, and a convex portion and concave portion of said fitting configurations provide a space for clamping an O-ring therebetween.

6. The power steering apparatus according to claim 2, wherein said controlling device is contained inside a housing connected to said hydraulic pump, said housing and hydraulic pump have fitting configurations, a cross section of said fitting configurations is approximately circular in shape, and a convex portion and a concave portion of said fitting configurations provide a space for clamping an O-ring therebetween.

* * * * *

UNITED STATES PATENT AND TRADEMARK OFFICE
CERTIFICATE OF CORRECTION

PATENT NO. : 6,233,930 B1
APPLICATION NO. : 09/462056
DATED : May 22, 2001
INVENTOR(S) : Hirofumi Matsuoka et al.

It is certified that error appears in the above-identified patent and that said Letters Patent is hereby corrected as shown below:

On the title page item (75) Inventor, change

"Yoshihiro Goto, Kashiwara, (JP)" to -- Yoshihiro Goto, Osaka, (JP)--; "Yoshiaki Hamasaki, Kashiba, (JP)" to -- Yoshiaki Hamasaki, Nara, (JP) --.

On the title page item (22) PCT, change,

"June 20, 1999" to --May 20, 1999--.

Signed and Sealed this

Fifth Day of December, 2006

JON W. DUDAS
*Director of the United States Patent and Trademark Office*